United States Patent
Pandya et al.

(10) Patent No.: US 11,023,442 B2
(45) Date of Patent: Jun. 1, 2021

(54) AUTOMATED STRUCTURING OF UNSTRUCTURED DATA

(71) Applicant: Accenture Global Solutions Limited, Dublin (IE)

(72) Inventors: Jigarkumar Ramanlal Pandya, Maharastra (IN); Devang Shantilal Shah, Maharastra (IN); Ravi Shankar Nori, Bangalore (IN); Nitin Vilas Tonapi, Pune (IN); Shrikant Sarda, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 113 days.

(21) Appl. No.: 16/282,944

(22) Filed: Feb. 22, 2019

(65) Prior Publication Data
US 2019/0266143 A1    Aug. 29, 2019

(30) Foreign Application Priority Data
Feb. 23, 2018   (IN) .............................. 201811006999

(51) Int. Cl.
| G06F 11/36 | (2006.01) |
| G06F 16/22 | (2019.01) |
| G06N 20/10 | (2019.01) |

(52) U.S. Cl.
CPC ...... *G06F 16/2282* (2019.01); *G06F 11/3688* (2013.01); *G06F 11/3692* (2013.01); *G06N 20/10* (2019.01)

(58) Field of Classification Search
CPC ............ G06F 11/3688; G06F 11/3692; G06F 16/2282; G06F 11/3684; G06F 11/3668; G06N 20/10; G06N 3/088
See application file for complete search history.

(56) References Cited

U.S. PATENT DOCUMENTS 6,301,701 B1 * 10/2001 Walker ................ G06F 11/3688
                                                    702/123
9,304,895 B1 *  4/2016 Shahrzad ............ G06F 11/3668
(Continued)

FOREIGN PATENT DOCUMENTS

WO    WO 2004/027705         4/2004
WO    WO-2004027705 A1 *  4/2004   .......... G06F 11/0781
(Continued)

OTHER PUBLICATIONS

AU Office Action in Australian Application. No. 2019201241, dated Dec. 9, 2019, 4 pages.
(Continued)

*Primary Examiner* — Yolanda L Wilson
(74) *Attorney, Agent, or Firm* — Fish & Richardson P.C.

(57) ABSTRACT

Methods, systems, and apparatus, including computer programs encoded on a computer storage medium, for accessing a database comprising multiple datasets. Each dataset includes data derived from a respective application. A machine-learning engine determines an analytical rule using at least one dataset of the multiple datasets. The analytical rule is determined by processing input data obtained from the at least one dataset derived from the respective application. A structured dataset is generated based on the determined analytical rule. The structured dataset is generated in response to using the determined analytical rule to analyze data from each dataset of the multiple datasets derived from the respective application. One or more data sequences that represent information flow of a transaction process are determined based on the structured dataset.

16 Claims, 6 Drawing Sheets

(56) References Cited

U.S. PATENT DOCUMENTS

| | | | |
|---|---|---|---|
| 9,836,389 B2* | 12/2017 | Levy | G06F 11/3684 |
| 10,185,641 B2* | 1/2019 | Isman | G06F 11/36 |
| 2008/0086660 A1* | 4/2008 | Wefers | G06F 11/3688 |
| | | | 714/37 |
| 2012/0278659 A1 | 11/2012 | Han et al. | |
| 2013/0246853 A1* | 9/2013 | Salame | G06F 11/3688 |
| | | | 714/37 |
| 2013/0346447 A1 | 12/2013 | Wu et al. | |
| 2015/0039941 A1* | 2/2015 | Kalyanasundram | |
| | | | G06F 11/3692 |
| | | | 714/38.1 |
| 2015/0095893 A1* | 4/2015 | Tripp | G06F 11/3684 |
| | | | 717/127 |
| 2015/0220605 A1 | 8/2015 | Syed et al. | |
| 2017/0046217 A1 | 2/2017 | Shashank et al. | |
| 2017/0364570 A1 | 12/2017 | Jacob et al. | |
| 2021/0026761 A1* | 1/2021 | Duffy | G06F 11/3688 |

FOREIGN PATENT DOCUMENTS

| | | |
|---|---|---|
| WO | WO 2016/040015 | 3/2016 |
| WO | WO 2017/114472 | 7/2017 |

OTHER PUBLICATIONS

AU Office Action in Australian Appln. No. 2019201241, dated May 14, 2020, 4 pages.

Australian Office Action in Australian Appln. No. 2019201241, dated Aug. 20, 2019, 7 pages.

IN Office Action in Indian Appln. No. 201811006999, dated Mar. 15, 2021, 7 pages.

* cited by examiner

| TAG_NAME | AnneParker_ | JustineJones_ | MikeJackson_ |
|---|---|---|---|
| root→name | Anne Parker | Justin Jones | |
| root→currency | EUR | EUR | |
| root→billcycleday | 1 | 1 | |
| root→paymentterm | Net 30 | Net 30 | |
| root→crmid | 0014E00000Iqvo7QAA | 0014E00000IqvnIQAA | |
| root→hpmcreditcardpaymentmethodid | 2c92c0f96140e566016155372o2a08fa | 2c92c0f96140e56601615525ee9702f3 | |
| root→billtocontact→address1 | 123 Main Street | 123 Main Street | |
| root→billtocontact→address2 | 123 Main Street | 123 Main Street | |
| root→billtocontact→city | New York | New York | |
| root→billtocontact→state | New York | New York | |
| root→billtocontact→zipcode | 19898 | 19898 | |
| root→billtocontact→country | United States | United States | |
| root→billtocontact→firstname | Anne | Justin | |
| root→billtocontact→lastname | Parker | Jones | |
| root→billtocontact→mobilephone | 5656756567756.00 | 6768769807565 | |
| root→billtocontact→Personalemail | ann@abc.com | justine@abc.com | |
| root→logdate | 2018-02-03 11:42 | 2018-01-03 02:30 | |

AUTOMATED STRUCTURING OF UNSTRUCTURED DATA

CROSS-REFERENCE TO RELATED APPLICATION

This application claims the benefit of Indian Provisional Patent Application No. 201811006999, filed Feb. 23, 2018, the entirety of which is hereby incorporated by reference.

FIELD

This specification relates to data structuring and process automation.

BACKGROUND

Automation technology has become more accessible and applicable to a vast number of industries and enterprise applications. Many companies have substantial unrealized opportunities for improving business processes with automation processes. For example, some companies accomplish software testing by relying on human workers to manually push buttons and to execute computing processes in order to test software programs. Also, currently many organizations depend on manual resources for system knowledge, learning insights for improving a business process, and evaluating applications that are used to execute a business process. Such manual approaches can be time consuming and ineffective at achieving key insights for improving business process and validating performance of software applications related to these processes. Hence, business processes that involve software testing and analysis can be improved by leveraging technology to learn the behavior and automate manual tasks.

SUMMARY

This specification describes techniques for improved automated structuring of unstructured data as well as software testing and validation of software test results. Techniques are described that can be used to replace human involvement in various phases of data structuring and software testing. The techniques involve leveraging data and machine learning processes to identify business flows based on analytical rules and process automation to improve information flow. The described systems can use improved process automation capabilities to mimic manual human actions. A machine-learning engine uses training algorithms to analyze log files and other data to learn transaction processes and automate execution of software test functions.

One aspect of the subject matter described in this specification can be embodied in a computer-implemented method. The method includes, accessing a database including multiple datasets, each dataset of the multiple datasets including data derived from a respective application. The method also includes determining an analytical rule using at least one dataset of the multiple datasets. The analytical rule is determined by a machine-learning engine that processes input data obtained from the at least one dataset derived from the respective application. The method includes generating a structured dataset based on the determined analytical rule, wherein the structured dataset is generated in response to using the determined analytical rule to analyze data from each dataset of the multiple datasets derived from the respective application; and determining, based on the structured dataset, one or more data sequences that represent information flow of a transaction process.

These and other implementations can each optionally include one or more of the following features. For example, in some implementations, the machine-learning engine includes a support vector machine ("SVM") and determining the analytical rule comprises: providing, to the SVM, the input data obtained from the at least one dataset; and processing, using the SVM, the input data to generate one or more data patterns based on vector scale analysis of a plurality of entities included in the input data. In some cases, the SVM implements a data mining logic of the machine-learning engine.

In some implementations, determining the analytical rule includes: using the data mining logic of the machine-learning engine to process the input data obtained from the at least one dataset, wherein the data mining logic includes at least one of a vector scale analysis algorithm or a network flow algorithm.

In some implementations, generating the structured dataset includes: identifying one or more functional blocks from the analyzed data, each functional block corresponding to an action for executing the transaction process; identifying, based on the one or more data patterns, a relationship between entities of respective functional blocks of the transaction process; determining sets of related entities based on the identified relationship between the entities; and generating the structured dataset using the sets of related entities.

In some implementations, each dataset includes unstructured data and generating the structured dataset includes: obtaining a plurality of unstructured data derived from one or more respective applications; and structuring, based on the analytical rule, the plurality of unstructured data to determine a data sequence that represents information flow for at least one functional block of the transaction process.

In some implementations, the transaction process includes one or more respective functional blocks and each functional block has at least one corresponding data sequence. In other implementations, the structured dataset is configured to enable testing of a software function of a first application from which a first dataset of the multiple datasets is derived; and the first application is associated with at least a first functional block of the transaction process.

In some implementations, the method further includes: using the structured dataset to test the software function of the first application program with reference to the first functional block of the transaction process, wherein testing the software function includes validating performance of the software function based on a set of test data that is generated in response to testing the software function.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular implementations and can result in one or more of the following advantages. The described computing system enables efficiencies such as increased system throughput and reduced processor utilization. Efficiencies can be realized through machine-learned process that automate and streamline generating structured datasets from unstructured log files and reduce computational steps required to evaluate performance of software functions used to execute a given transaction. Machined-learned inferences for structuring datasets and determining transaction data sequences are iteratively refined to minimize computational steps needed to structure the data.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes techniques, systems, and apparatus, including computer programs encoded on a computer storage medium, for accessing a database that includes multiple datasets. Each dataset of the multiple datasets includes data that is associated with an ad hoc process flow. For example, the data associated with ad hoc or arbitrary process flows are not organized or sequenced based on connections between entities and items (e.g., text, images, terms) in the data. The techniques and systems can be used to determine an analytical rule for generating data sequences that represent overall information flow of a particular transaction process. The analytical rule is determined using a machine-learning engine and based on analysis of at least one dataset associated with the ad hoc process flow.

The data sequences are determined from a structured dataset that is generated from the multiple datasets in the database. For example, the data sequences are determined using data mining logic, of the machine-learning engine, that is refined using the analytical rule. In some implementations, the data mining logic is analyzed against the structured dataset to determine the data sequences of the transaction process. The transaction process can correspond to a particular process or workflow and may be implemented by one or more applications (e.g., a software program) that generate the data associated with the ad hoc process flow.

For example, the transaction process can be an example computational, analytical, or business related process in which data and other information is exchanged between applications 110 to accomplish a particular task (or actions). In some implementations, an example transaction can involve functional tasks for completing or processing a device order for a customer. In this example, the discrete functional tasks that are executed to complete the transaction can include receiving or accessing the customer's personal information (e.g., a first functional block), determining or locating the particular device desired by the customer (e.g., a second functional block), causing the device to be packaged for shipment (e.g., a third functional block), and shipping the device to the customer (e.g., a fourth functional block).

Figure 1:
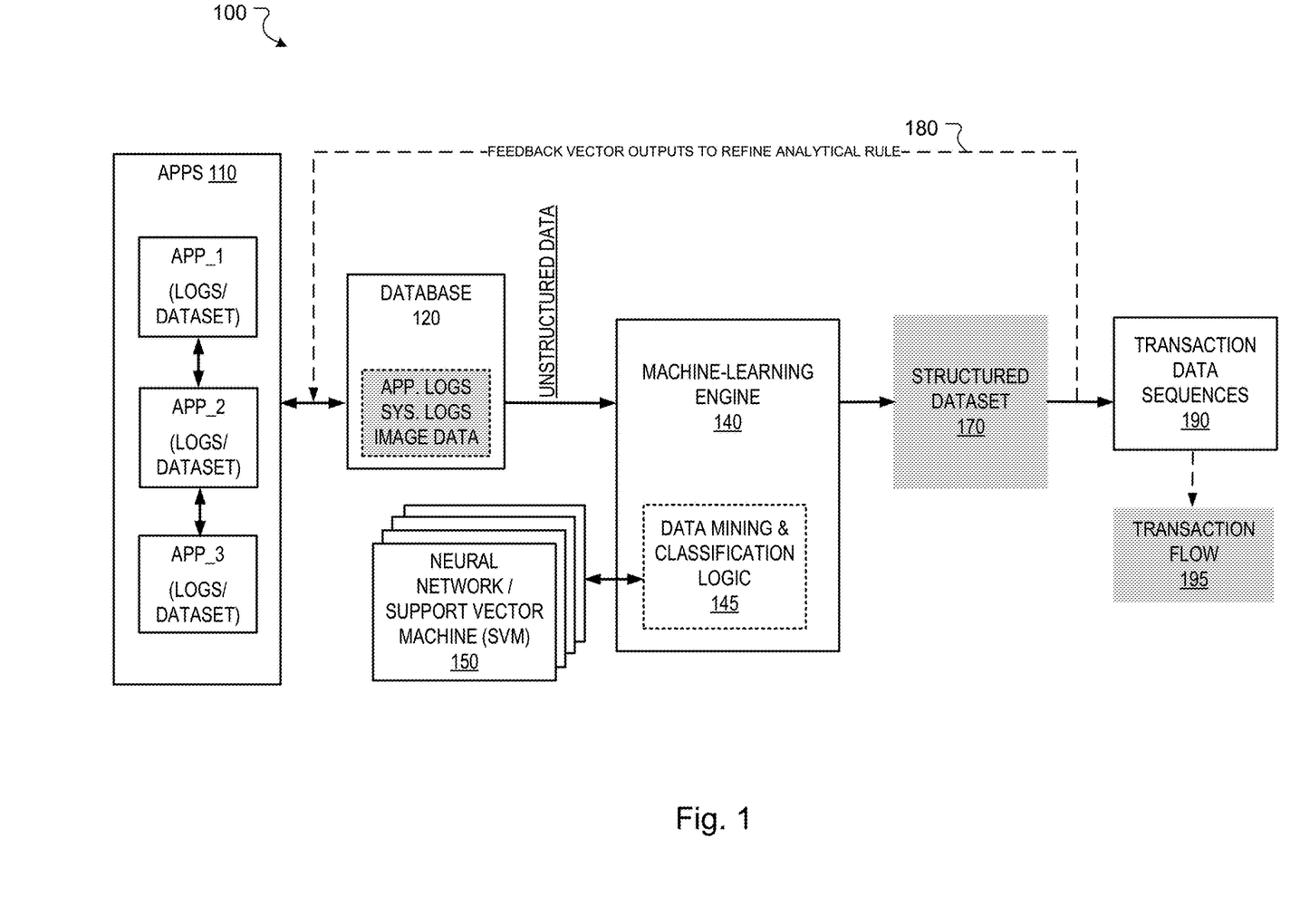
FIG. 1 shows a functional architecture of an example computing system for performing automated structuring of unstructured data.

FIG. 1 shows a functional architecture of a computing system 100 for performing automated structuring of unstructured data. In some implementations, system 100 can include one or more processors, memory, and data storage devices (e.g., non-transitory storage devices) that collectively form the computing system 100. The processors of the system 100 process instructions for execution by devices and components of the system, including instructions stored in the memory or on storage devices for performing operations/actions described in this document.

For example, execution of the stored instructions can cause performance of the one or more operations that are described in more detail below. In other implementations, multiple processors may be used, as appropriate, along with multiple memories and types of memory. For example, devices and components of system 100 may be connected with multiple other computing devices, with each device (e.g., a server bank, groups of servers, or a multi-processor system) performing portions of the actions or operations associated with the processes or logical flows described in this specification.

In general, system 100 can be implemented, in part, by execution of program code in the form of an executable application, otherwise known as an "app," that can be launched or executed using a client or user device. Upon execution, the app can establish a data connection with server(s) of system 100 to transmit data signals to the server as well as receives data signals from the server.

Referring again to FIG. 1, the system 100 generally includes applications 110, a database 120, and a machine-learning engine 140 (described below). The applications 110 are a suite of application programs that are associated with functional blocks of an example transaction process. The applications programs can each interact to exchange data communications for executing discrete functional tasks for completing a particular transaction or discrete tasks that are associated with a given transaction. The application programs ("applications 110") generate multiple log files. Each log file can correspond to a respective dataset. For example, a first application, App_1, can use a log file or data in the log file to communicate with other applications, such as a second application, App_2, or a third application, App_3. The log files can be one or more a variety of file types, such as XML files, system log files, text files, JSON file, or files representing image.

An example transaction process will now be described. A user/customer may attempt to place an order for a mobile device with a telecom company (e.g., Mobile ABC), where the order represents a transaction and tasks for executing the transaction represent the transaction process. The order may be one of thousands of orders received by the company within a certain time period (e.g., days, weeks, months, etc.) In some implementations, an example transaction process can include different tasks based on the manner in which the user attempts to place the order with the company. For example, user can place an order using a webpage, at a physical store or location shop, or by phone. In some cases, the different options for placing the order correspond to different transaction processes.

To place the order a user provides data including personal information, such as a first name, a last name, a shipping address, a billing address, an age, a type for the mobile device, or other required data. In some cases, each piece of information can represent a data item, such as an entity, term, or data field in a log file dataset when an application program receives user input that specifies each information item. In some implementations, applications 110 receive and process the data items using an example back-end server(s) of system 100. Processing each data item to execute the transaction can correspond to a discrete task of the transaction.

For example, processing the user's shipping address to generate a shipping label may correspond to one or multiple tasks for executing the transaction. The data items may be exchanged between multiple applications 110 via one or more servers and computing elements of system 100. For example, data items for thousands of user orders are exchanged between multiple applications 110 (e.g., via multiple back-end servers), at different stages of a transaction, and using data sequences for information flows. In some implementations, a log file can include multiple datasets that represent data and file accesses indicating the data is being used to execute an action for a specific transaction.

In some cases, multiple file accesses and data exchanges might occur for a single task or functional block. For example, an address entity might be first accessed to process payment information at a second stage (e.g., functional block_B of FIG. 2) of the transaction and that same address entity is later accessed to generate a shipping label at a sixth stage (e.g., functional block_F, 240, of FIG. 2) of the transaction. In some implementations, these multiple files accesses indicate extraneous or redundant computing operations that can be streamlined to a single access operation in which information for the address entity is accessed once and flows sequentially for order processing and generating the shipping label. In one example, references to various stages (e.g., a second stage or a sixth stage) represent examples of different functional blocks of a business or transaction flow.

Figure 2:
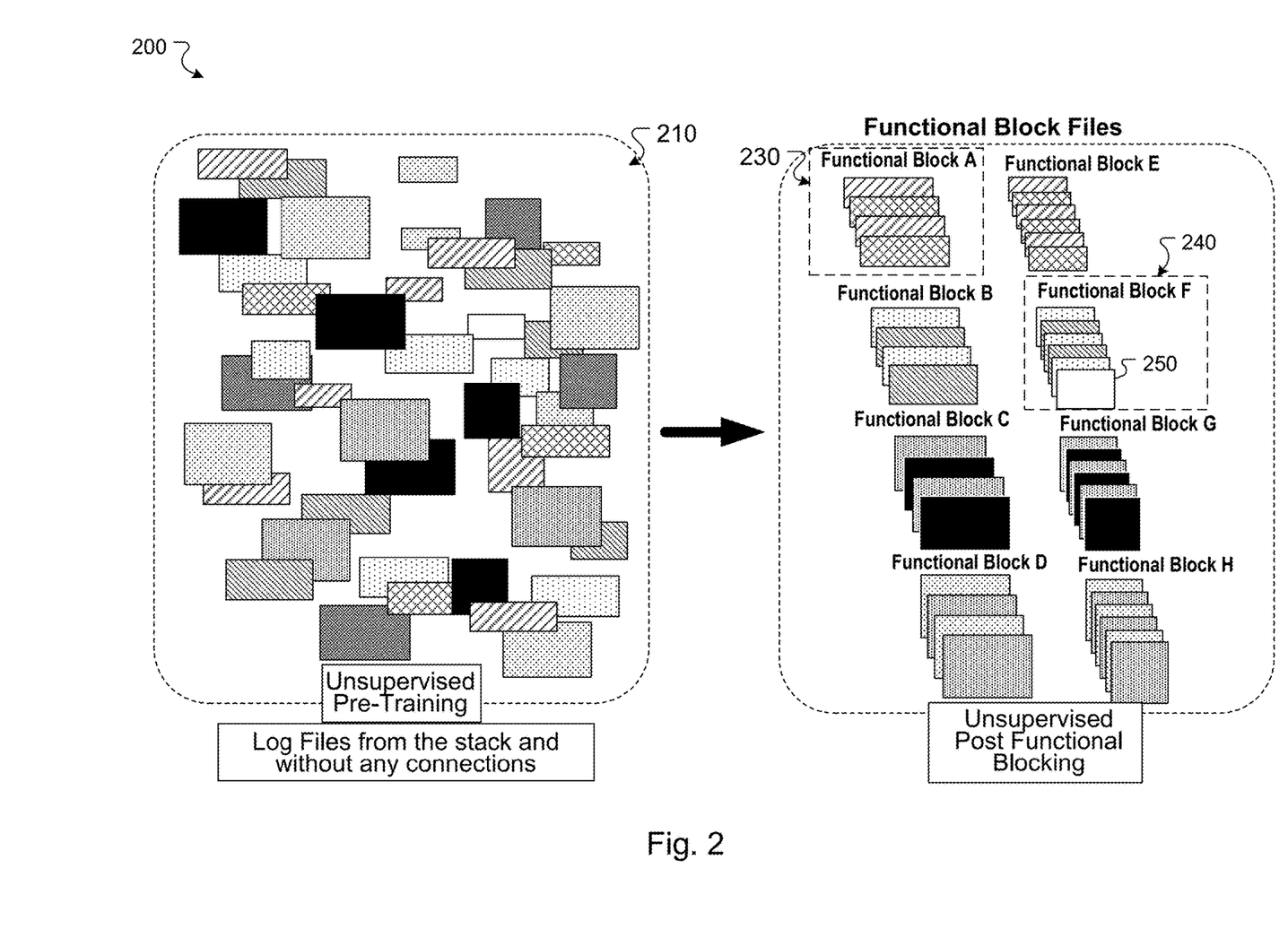
FIG. 2 shows log files of an example unstructured dataset and functional blocks of an example structured dataset.

A functional block, as indicated at FIG. 2, can correspond to a respective stage of an example transaction process, a respective task of a transaction process, or a group of tasks that are associated with the respective stage of the transaction process. For example, one functional block can correspond to a group of tasks for receiving and processing customer information to generate a device order or while another functional block can correspond to a group of tasks for triggering device repair actions based on warranty coverage of the device that was ordered.

The transaction process can include multiple respective functional blocks, e.g., blocks 230, 240, and each functional block can have at least one corresponding data sequence 250. In some implementations, the data sequence of the functional block is organized or sequenced based on information included in multiple logs generated by one or more of applications 110.

The database 120 is configured to store the multiple respective datasets. In one example, a log file can include multiple datasets or a log file can include a single dataset. Each dataset of the multiple datasets corresponds to at least one log file and includes data derived from a respective application. In some implementations, database 120 stores multiple different types of information, data, and log files that correspond to the variety of file types described above.

In one example, database 120 stores an example training dataset (described below) that is used to train a vector machine of ML engine 140. At least a portion of the information stored in database 120 corresponds to unstructured data. This unstructured data can be generated based on data and information that flows in an ad hoc or arbitrary manner when applications 110 are used to execute functional tasks of a transaction.

In this manner, the unstructured data stored in database 120 may not indicate how data flows sequentially to accomplish a given task or multiple tasks of the transaction. As discussed in more detail below, the techniques described in this document include using unstructured data from at least the log file datasets of database 120 to generate at least one structured dataset. The described techniques also include using the generated structured dataset to determine logical data sequences that represent a sequenced information flow for a transaction process. In some implementations, the data sequences may define information flows (e.g., for a transaction/business process) that are optimized relative to ad hoc or arbitrary information flows indicated by the unstructured dataset.

In general, the system 100 is configured to determine a transaction flow based on a set of unstructured data that is processed by the machine-learning engine 140 ("ML engine 140"). System 100 uses data mining and classification logic 145 of machine-learning engine 140 at least to generate the unstructured data. In some implementations, the data mining logic 145 is based on an unsupervised learning algorithm for determining latent patterns in log files of the multiple datasets stored in database 120. The ML engine 140 executes the data mining logic 145 to determine an example analytical rule using at least one dataset of the multiple datasets.

In some implementations, the analytical rule is determined in response to the ML engine 140 processing input data obtained from the at least one dataset derived from the respective application. The ML engine 140 can include a support vector machine ("SVM") 150 that is used to process an input dataset to determine the analytical rule. The input dataset can be a training dataset stored in database 120. This training dataset includes labeled data that is used to train SVM 150 of ML engine 140 such that an analytical rule can be derived for analyzing sets of unstructured data to generate a structured dataset 170.

For example, the training dataset can include sets of labels or data fields (e.g., name, address, device type, etc.) that are specific to a particular transaction executed by system 100. Determining the analytical rule can include providing the input data obtained from the at least one training dataset to the SVM 150 to train the SVM 150. Determining the analytical rule can further include processing the input data using the SVM 150. The input data is processed by the SVM 150 to generate one or more data patterns for training the SVM 150 to perform certain data analysis functions. In some implementations, the SVM 150 generates the data patterns based on vector scale analysis of multiple entities included in the input data.

ML engine 140 can also be configured to perform unsupervised data mining and classification of unstructured data stored in database 120. For example, the ML engine 140 can include one or more neural networks 150 (e.g., pre-trained neural networks) that employ one or more unsupervised learning algorithms to perform analysis and term or entity recognition on input data obtained from database 120. In some implementations, system 100 uses an SVM 150 to implement certain machine-learning functions that relate to supervised learning, while in other implementations system 100 uses neural networks 150 to operate in an unsupervised mode to implement certain machine-learning functions that relate to unsupervised learning.

System 100 can be configured to improve upon or further optimize output determinations that are generated using data models of ML engine 140. For example, system 100 includes a feedback loop 180 that enables certain output determinations (e.g., structured or sequenced data) to be fed back as inputs to system 100. In some implementations, database 120 is partitioned to include a portion of memory for storing structured datasets that are fed back to be further processed by data models of ML engine 140. The structured datasets that are fed back can be further processed to refine a prior analytical rule determined using ML engine 140. In some cases, based on the feedback loop 180, embedded vectors (outputs) are fed back to the system 100 as data inputs that are analyzed to iteratively enhance or refine the structured data outputs and determinations generated using the ML engine 140.

The SVM 150 can be trained (e.g., a trained data model) to perform various data structuring and data classification functions for determining one or more data sequences 190 from large datasets of unstructured data or log files. System 100 uses one or more trained data models of ML engine 140 to determine data sequences 190 that represent information flow of a transaction process 195. In some cases, the system 100 can be used to implement improved data mapping to determine more optimal data sequences for improving information flow of a given transaction process with little, or no, dependency on a manual workforce.

FIG. 2 shows log files of an example unstructured dataset 210 and functional blocks of an example structured dataset 220. The structured dataset 220 includes a first functional block 230, block_A, and a second, different functional block 240, block_B. As used herein, block_A and block_B relate to functional blocks indicated at FIG. 2 and can correspond to a respective stage of an example transaction process, a respective task of a transaction process, or a group of tasks that are associated with the respective stage of the transaction process. As described above, the ML engine 140 is used to generate a structured dataset 220 based on a determined analytical rule. The analytical rule can be determined in response to processing input data to generate data patterns. The data patterns can be generated based on vector scale analysis of multiple entities of the input data and using the SVM or neural network 150.

The analytical rule as well as generating the structured dataset can be performed based at least on the ML engine 140 processing one or more log files to identify data items, such as unique terms, data fields, or tags in the log file. The ML engine 140 can determine whether sets of data items are related based on a match between at two data items of different tasks or functional blocks. For example, the same customer entity may appear in distinct log files for the same functional block or groups of functional blocks. ML engine 140 can generate data connections or links between combinations of related entities using the determined matches.

In some implementations, using ML engine 140 to generate the structured dataset 220 includes: i) identifying one or more functional blocks, each functional block corresponding to a particular application of applications 110; (ii) identifying, based on the one or more data patterns, a relationship between entities of respective functional blocks that are associated with a transaction process; and (iii) determining sets of related entities for one or more functional blocks based on the identified relationship between the entities.

As indicated above, log file datasets of database 120 include unstructured data. In some cases, generating the structured dataset 220 includes: (i) obtaining multiple sets of unstructured data that are derived from one or more respective applications; and (ii) structuring the multiple sets of unstructured data based on the determined analytical rule. The structured dataset 220 is used to determine a data sequence that represents information flow for at least one functional block of the transaction process. For example, functional block 240 includes an example data sequence 250 that represents organized information flow. The information flow can be for an example functional block of a transaction that involves processing personal data input by multiple different customers for an online order.

Figure 3A:
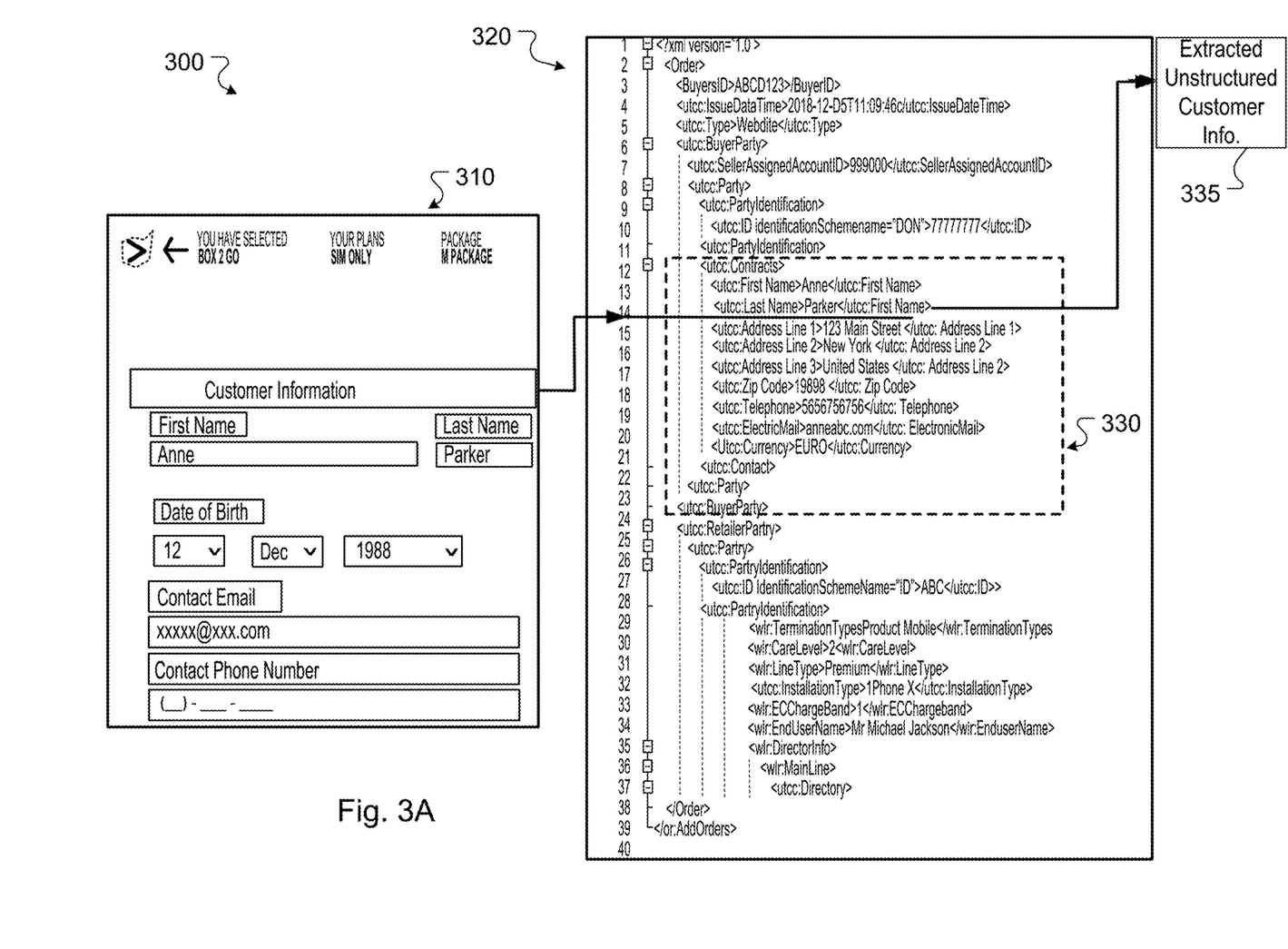
FIG. 3A shows an example interface and extracted unstructured data associated with an application program.

FIG. 3A shows example interfaces 300 that can be associated with an example application program of applications 110. The application can be a respective application from which a log file dataset is derived and stored at database 120. A first interface 310 includes inputs blocks that are configured to receive entity information that can be used to perform functional tasks for a given transaction. A second interface 320 indicates example software operations 330 that relate to processing or analyzing the received entity information. In general, the entity information received at interface 310 can be used by applications 110 to perform respective functional tasks for a given transaction. As noted above, system 100 receives and stores data and log files generated by the applications 110. In some implementations, system 100 may obtain or extract at least a portion of unstructured data 335 for processing by ML engine 140.

Figure 3B:
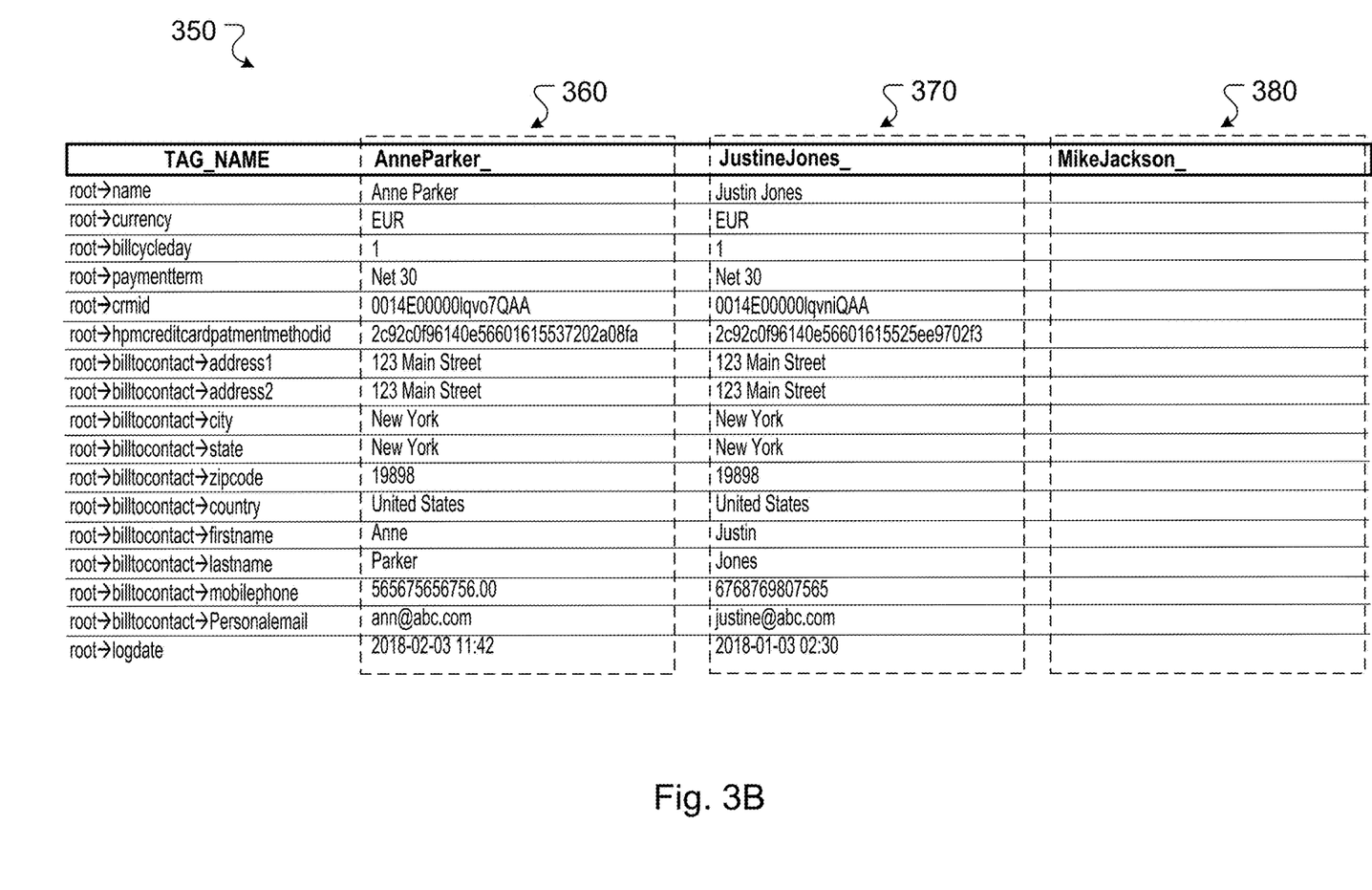
FIG. 3B shows an example set of data that is processed to generate a structured dataset.

FIG. 3B shows an example set of data 350 that is processed to generate a structured dataset. The set of data 350 can include a first dataset 360, a second dataset 370, and a third dataset 380. In some implementations, each dataset 360, 370, 380 of data 350 can be derived from the same application of system 100 or from respective different applications of system 100. For example, each dataset 360, 370, 380 can be information included in a log file dataset derived from a respective application, such as an electronic device ordering processing application that is used to perform functional tasks of a transaction process for completing an online order.

Each dataset in the set of data 350 includes multiple respective entities and corresponding data fields for the entities. For example, one entity, entity_1, can be customer name and corresponding data fields for this entity_1 can be a first data field for storing the customer's first name and a second data field for storing the customer's last name. Another entity, entity_2, can be customer address and corresponding data fields for this entity_2 can be a first data field for storing a first address line of the customer's home address and a second data field for storing a second address line of the customer's home address. In some implementations, each entity can have one or multiple corresponding data fields.

Figure 4:
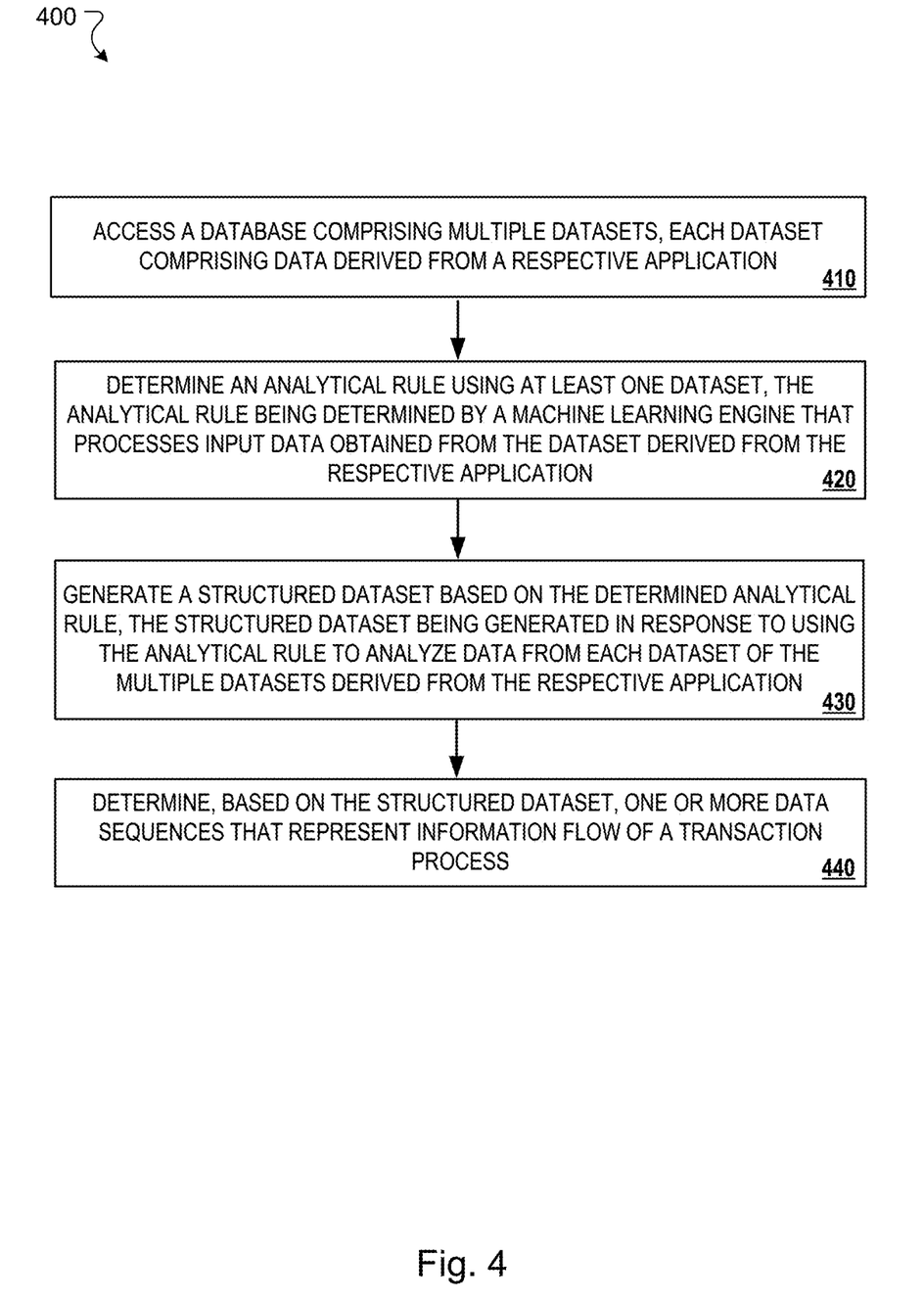
FIG. 4 shows an example process for performing automated structuring of unstructured data to generate data sequences for a transaction flow.

FIG. 4 shows an example process 400 for performing automated structuring of unstructured data to generate data sequences for a transaction flow. Process 400 can be implemented using one or more computing elements of system 100 described above as well as other components and instructions described in this document.

Process 400 includes the system 100 accessing a database that includes multiple datasets (410). Each dataset of the multiple datasets includes data derived from a respective application. For example, applications 110 can represent a suite of application programs that each interact to perform functional tasks of a transaction process. The system 100 determines an analytical rule using at least one dataset of the multiple datasets (420). The analytical rule is determined by a machine-learning engine that processes input data obtained from the at least one dataset derived from the respective application. In some implementations, the ML engine 140 determines the analytical rule by deriving probable matches and connections between data items in a log file dataset using semantic analysis based on or more algorithms. For example, the ML engine 140 can use data mining logic that includes a vector scale analysis algorithm or a network flow algorithm to process the input data obtained from the dataset, where the data mining logic.

The system 100 generates a structured dataset based on the determined analytical rule (430). The structured dataset is generated in response to system 100 using the analytical rule to analyze data from each dataset of the multiple datasets derived from the respective application. In some implementations, ML engine 140 uses one or more trained data models to analyze information for each data item, such as a term, entity, or data field for entities in a log file or dataset. For example, the ML engine 140 can determine a number of times each term or data item is used across unstructured data of multiple log files and to execute actions for different functional blocks.

In some implementations, structuring a set of unstructured data includes determining a relationship between each entity and term in datasets for multiple respective functional blocks of a transaction. For example, the determined relationship can indicate one entity is connected with another entity based on that particular entity being accessed or used to execute tasks or actions included in at least two distinct functional blocks. The data can be arranged such that the particular entity is grouped or organized with other related entities or terms used to execute a particular action. The system 100 can generate a structured dataset based on the arranged grouping of related entities and terms for various actions of a functional block.

System 100 can also generate a structured dataset at least by sequencing discrete actions of a transaction process to streamline or optimize the flow of data and information between respective applications used to execute the actions. For example, data such as entities and terms accessed to perform a first action in a business process can also be later accessed to perform a fourth or seventh action in the process. The ML engine 140 may use data mining logic 145 to determine this relationship and structure the data by grouping these entities and terms as being associated with the first, fourth, and seventh action.

The system 100 determines one or more data sequences based on the structured dataset (440). For example, the ML engine 140 can determine a data sequence for a functional block, where the data sequence causes the first, fourth, and seventh actions to be executed sequentially. The one or more data sequences represent information flow of an example transaction process. The transaction process can include multiple respective functional blocks 230, 240 and each functional block can have at least one corresponding data sequence 250.

In some implementations, a particular structured dataset used to determine a data sequence can also enable automated testing of a software function of an application from which a log file dataset is derived. Specifically, the ML engine 140 can use the data sequences determined from the structured dataset to automate execution of a software test(s) for evaluating programmed functions of the applications 110, including validating performance of an application based on software test results of the automated testing. For example, ML engine 140 can use a listing of sequenced tasks or actions included in a data sequence as a reference for evaluating how well a particular application 110 executes computing operations for accomplishing tasks included in the listing.

In some implementations, application 110 is tested with reference to a particular functional block of an example transaction process. Testing the software functions of the application 110 can also include validating performance of the software function based on test data/results generated from scripts used to evaluate the software functions. For example, performance of the software functions can be validated in response to ML engine 140 determining that the test data includes information which matches the listings of tasks in the data sequence determined from the structured dataset.

Figure 5:
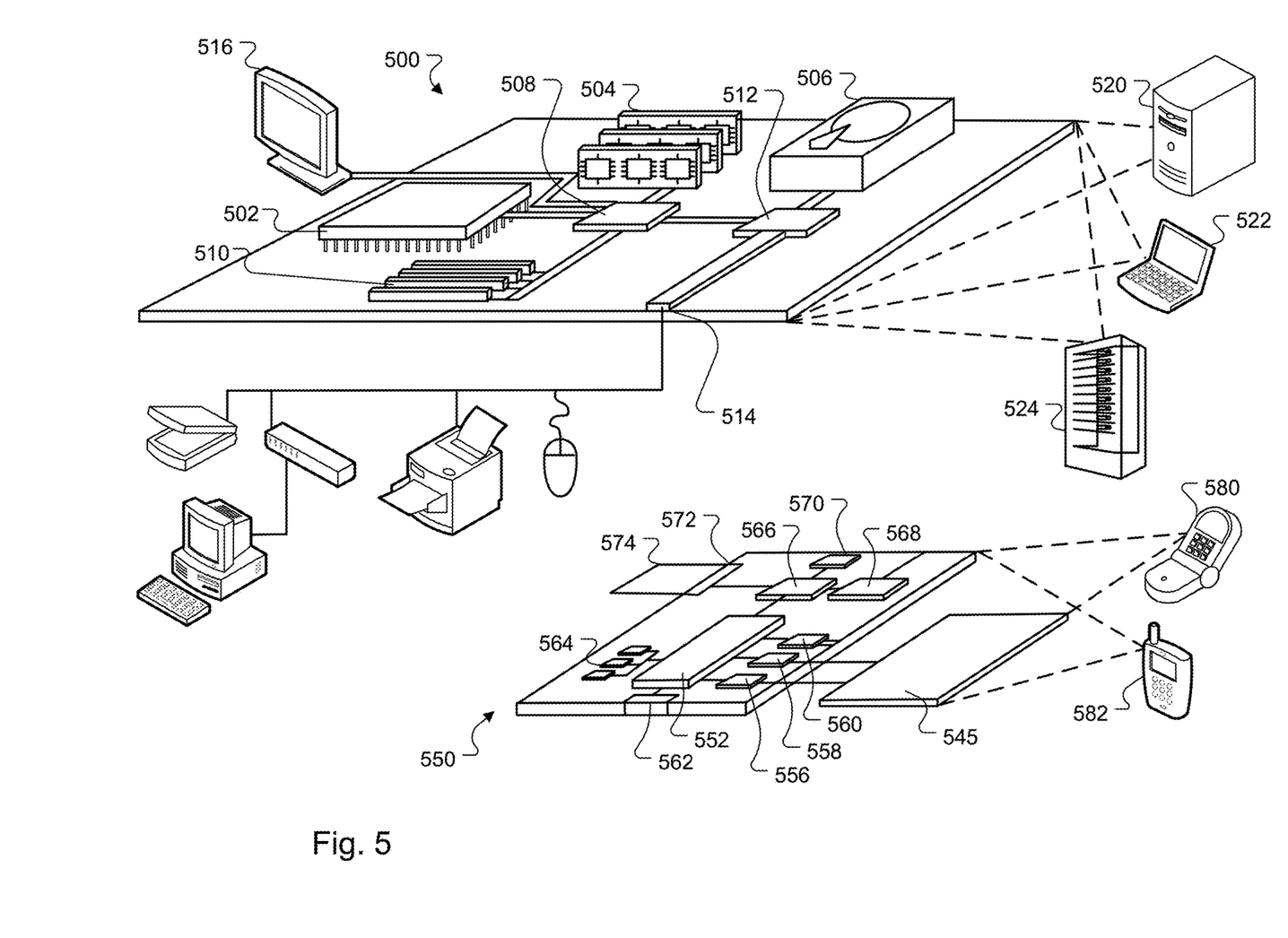
FIG. 5 shows a block diagram of an example computing system that can be used in connection with computer-implemented methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method comprising:
    accessing a database comprising multiple datasets, each dataset of the multiple datasets comprising data derived from a respective application;
    determining an analytical rule using at least one dataset of the multiple datasets, the analytical rule being determined by a machine-learning engine that processes input data obtained from the at least one dataset derived from the respective application;
    generating a structured dataset based on the determined analytical rule, wherein the structured dataset is generated in response to using the determined analytical rule to analyze data from each dataset of the multiple datasets derived from the respective application; and
    determining, based on the structured dataset, one or more data sequences that represent information flow of a transaction process,
    wherein:
        the transaction process comprises one or more respective functional blocks and each functional block has at least one corresponding data sequence,
        the structured dataset is configured to enable testing of a software function of a first application from which a first dataset of the multiple datasets is derived, and
        the first application is associated with at least a first functional block of the transaction process.

2. The method of claim 1, wherein the machine-learning engine includes a support vector machine ("SVM") and determining the analytical rule comprises:

providing, to the SVM, the input data obtained from the at least one dataset; and processing, using the SVM, the input data to generate one or more data patterns based on vector scale analysis of a plurality of entities included in the input data.

3. The method of claim 2, wherein the SVM implements a data mining logic of the machine-learning engine.

4. The method of claim 3, wherein determining the analytical rule comprises:

using the data mining logic of the machine-learning engine to process the input data obtained from the at least one dataset, wherein the data mining logic includes at least one of a vector scale analysis algorithm or a network flow algorithm.

5. The method of claim 4, wherein generating the structured dataset comprises:

identifying one or more functional blocks from the analyzed data, each functional block corresponding to an action for executing the transaction process;

identifying, based on the one or more data patterns, a relationship between entities of respective functional blocks of the transaction process;

determining sets of related entities based on the identified relationship between the entities; and generating the structured dataset using the sets of related entities.

6. The method of claim 1, wherein each dataset includes unstructured data and generating the structured dataset comprises:

obtaining a plurality of unstructured data derived from one or more respective applications; and structuring, based on the analytical rule, the plurality of unstructured data to determine a data sequence that represents information flow for at least one functional block of the transaction process.

7. The method of claim 1, further comprising:

using the structured dataset to test the software function of the first application program with reference to the first functional block of the transaction process, wherein testing the software function includes validating performance of the software function based on a set of test data that is generated in response to testing the software function.

8. A system, comprising:

one or more processing devices; and one or more non-transitory machine-readable storage devices storing instructions that are executable by the one or more processing devices to cause performance of operations comprising:

accessing a database comprising multiple datasets, each dataset of the multiple datasets comprising data derived from a respective application;

determining an analytical rule using at least one dataset of the multiple datasets, the analytical rule being determined by a machine-learning engine that processes input data obtained from the at least one dataset derived from the respective application;

generating a structured dataset based on the determined analytical rule, wherein the structured dataset is generated in response to using the determined analytical rule to analyze data from each dataset of the multiple datasets derived from the respective application; and determining, based on the structured dataset, one or more data sequences that represent information flow of a transaction process, wherein:

the transaction process comprises one or more respective functional blocks and each functional block has at least one corresponding data sequence, the structured dataset is configured to enable testing of a software function of a first application from which a first dataset of the multiple datasets is derived, and the first application is associated with at least a first functional block of the transaction process.

9. The system of claim 8, wherein the machine-learning engine includes a support vector machine ("SVM") and determining the analytical rule comprises:

providing, to the SVM, the input data obtained from the at least one dataset; and processing, using the SVM, the input data to generate one or more data patterns based on vector scale analysis of a plurality of entities included in the input data.

10. The system of claim 9, wherein the SVM implements a data mining logic of the machine-learning engine.

11. The system of claim 10, wherein determining the analytical rule comprises:

using the data mining logic of the machine-learning engine to process the input data obtained from the at least one dataset, wherein the data mining logic includes at least one of a vector scale analysis algorithm or a network flow algorithm.

12. The system of claim 11, wherein generating the structured dataset comprises:

identifying one or more functional blocks from the analyzed data, each functional block corresponding to an action for executing the transaction process;

identifying, based on the one or more data patterns, a relationship between entities of respective functional blocks of the transaction process;

determining sets of related entities based on the identified relationship between the entities; and generating the structured dataset using the sets of related entities.

13. The system of claim 8, wherein each dataset includes unstructured data and generating the structured dataset comprises:

obtaining a plurality of unstructured data derived from one or more respective applications; and structuring, based on the analytical rule, the plurality of unstructured data to determine a data sequence that represents information flow for at least one functional block of the transaction process.

14. The system of claim 8, wherein the operations further comprise:

using the structured dataset to test the software function of the first application program with reference to the first functional block of the transaction process, wherein testing the software function includes validating performance of the software function based on a set of test data that is generated in response to testing the software function.

15. One or more non-transitory machine-readable storage devices storing instructions that are executable by one or more processing devices to cause performance of operations comprising:

accessing a database comprising multiple datasets, each dataset of the multiple datasets comprising data derived from a respective application;

determining an analytical rule using at least one dataset of the multiple datasets, the analytical rule being determined by a machine-learning engine that processes input data obtained from the at least one dataset derived from the respective application;

generating a structured dataset based on the determined analytical rule, wherein the structured dataset is generated in response to using the determined analytical rule to analyze data from each dataset of the multiple datasets derived from the respective application; and determining, based on the structured dataset, one or more data sequences that represent information flow of a transaction process, wherein:
- the transaction process comprises one or more respective functional blocks and each functional block has at least one corresponding data sequence,
- the structured dataset is configured to enable testing of a software function of a first application from which a first dataset of the multiple datasets is derived, and
- the first application is associated with at least a first functional block of the transaction process.

16. The machine-readable storage devices of claim 15, wherein the machine-learning engine includes a support vector machine ("SVM") and determining the analytical rule comprises:

providing, to the SVM, the input data obtained from the at least one dataset; and processing, using the SVM, the input data to generate one or more data patterns based on vector scale analysis of a plurality of entities included in the input data.

* * * * *